United States Patent [19]

Moore et al.

[11] Patent Number: 4,520,681

[45] Date of Patent: Jun. 4, 1985

[54] APPARATUS FOR MEASURING TORQUE ON A ROTATING SHAFT

[75] Inventors: Jeff D. Moore; Eddie C. Moore, both of Mansfield; Burnis H. Tucker, Joshua; William P. Goodwill, Plano, all of Tex.

[73] Assignees: Jeff D. Moore; Eddie C. Moore, both of Mansfield, Tex.

[21] Appl. No.: 590,892

[22] Filed: Mar. 19, 1984

[51] Int. Cl.³ ............................ G01L 3/12; G01L 3/24
[52] U.S. Cl. .................. 73/862.28; 73/862.34
[58] Field of Search ..................... 73/862.28, 862.34

[56] References Cited

U.S. PATENT DOCUMENTS

| | | |
|---|---|---|
| 2,136,223 | 11/1938 | Thomas . |
| 2,313,923 | 3/1943 | Chubb . |
| 2,564,484 | 8/1951 | Kuehni . |
| 2,681,564 | 6/1954 | Jeromson, Jr. et al. . |
| 2,938,378 | 5/1960 | Canada et al. . |
| 3,309,920 | 3/1967 | Cuthbert ............... 73/862.34 |
| 3,329,012 | 7/1967 | Demuth . |
| 3,487,402 | 12/1969 | Hillhouse . |
| 3,564,909 | 2/1971 | Foskett et al. . |
| 3,589,178 | 6/1971 | Germann ............... 73/862.34 |
| 3,603,144 | 9/1971 | Smith . |
| 3,640,131 | 2/1972 | Turk ..................... 73/862.28 |
| 3,729,991 | 5/1973 | Hardway, Jr. . |
| 3,938,890 | 2/1976 | Flavell . |
| 3,940,979 | 3/1976 | Ward et al. . |
| 4,091,451 | 5/1978 | Weiner et al. ........ 73/862.23 X |
| 4,345,481 | 8/1982 | Schroyer ............... 73/862.34 |
| 4,356,732 | 11/1982 | Hachtel et al. . |

OTHER PUBLICATIONS

Bhatti et al., "Accurate Digital Torque Angle Meter", IE(I) Journal-EL-vol., 61, Dec. 1980, pp. 111-115.

Primary Examiner—Charles A. Ruehl
Attorney, Agent, or Firm—Jerry W. Mills; Gregory M. Howison; Nina L. Medlock

[57] ABSTRACT

A mobile dynamometer includes a slotted disk (12) and slotted disk (14) disposed on a rotating shaft (10) a predetermined distance apart. A slot (16) is formed in the periphery of the disk (12) and a slot (18) is formed in the periphery of the disk (14). A light source (20) and a light sensor (22) are mounted stationary with respect to the shaft and proximate the periphery of the disk (12). When the slot (16) passes proximate the source (20) and the sensor (22), a signal is generated. A light source (24) and a detector (26) are mounted proximate the periphery of the disk (14) such that passage of the slot (18) thereby generates a signal. The signal generated by the sensors (22) and (26) are two state signals. The time duration between the signals is measure and the angular deviation of the two disks (12) and (14) can be calculated therefrom. Measurement of this angular deviation determines the amount of twist on the shaft portion (28) between the two disks (12) and (14). The torque can then be calculated from this angle of twist.

8 Claims, 9 Drawing Figures

APPARATUS FOR MEASURING TORQUE ON A ROTATING SHAFT

TECHNICAL FIELD OF THE INVENTION

The present invention pertains in general to dynamometers and, more particularly, to dynamometers for measuring instantaneous torque on a rotating shaft.

BACKGROUND OF THE INVENTION

Measurement of torque under dynamic conditions requires measurement of the amount of twist on a rotating shaft and the calculation of torque therefrom knowing the parameters of the shaft. This type of measurement has heretofore required some form of rotating activation mechanism attached to the shaft which activates an external sensor and provides for measurement of angular deviations of the rotating shaft. These external sensors have previously comprised optoelectronic devices, transformers or capacitive mechanisms, and have required considerable and expensive external excitation and detection circuitry to extract the signal from the rotating activation devices.

U.S. Pat. No. 3,938,890 issued to Flavell on February 1976, U.S. Pat. No. 3,487,402 issued to Hillhouse on December 1969 and U.S. Pat. No. 3,940,979 issued to Ward on March 1976, illustrate examples of prior contactless, indirect torque measurement devices. Ward and Flavell teach the use of optical sensing of the angular displacement, while Hillhouse discloses the use of a capacitive measuring device.

The Ward patent discloses a light source and a detector to detect the presence of slots on the periphery of two rotating disks. Each of the rotating disks is attached to two separate points spaced a predetermined distance apart on the surface of the torsioned shaft. By measuring the relative position of the slots on the two disks with the detected light from the light source, an indication of the twist in the shaft can be obtained. However, this device requires precise alignment of the two disks and the measurement of a light level to determine the relation between the slots and the two disks. This is a disadvantage in that various factors such as contamination and misalignment can affect the intensity of the light, thereby introducing a probability of error into the twist measurement. Such disadvantages are also seen in the Flavell device, which utilizes two polarizing disks with light sources shining therethrough.

In both the Ward and the Flavell devices, the light source is disposed on one side of the disks and the detector is disposed on the other side thereof. Therefore, the light from the light source passing through the two disks is modulated by the slots in Ward and the polarizing axis in Flavell. It is this modulation of the light that is detected to provide an indication to an external device of the actual twist. However, the light source, and the modulation thereof, is susceptible to many external parameters which can introduce error into the measurement.

In view of the above disadvantages, there exists a need for a contactless, indirect torque measurement device that is not subject to the inherent limitations of previously developed devices, etc.

SUMMARY OF THE INVENTION

The present invention disclosed and claimed herein comprises a method and apparatus for measuring torque on a rotating shaft. The apparatus includes a first sensor that is mounted proximate to the shaft and having first and second states. A second sensor is also mounted proximate the shaft and also has first and second states. A first activating device is mounted on the shaft proximate the first sensor and is operable to momentarily change states of the first sensor when a first reference point on the shaft rotates past the first sensor. A second activating device is mounted proximate a second reference point on the shaft and is operable for changing states of the second sensor when the second reference point rotates proximate the second sensor. The first and second reference points are displaced along the rotational axis of the shaft a predetermined distance. Circuitry is provided for sensing the states of the first and second sensors and determining the relative positions of the first and second reference points with respect to the rotational axis of the shaft such that the amount of twist on the shaft can be measured as a function of the amount of applied torque on the shaft. The torque is then calculated from the measured amount of twist on the shaft between the first and second reference points.

In yet another embodiment of the present invention, the first and second sensors each include a separate light source and detector mounted proximate the shaft. The activating means comprises rotating slotted disks having one or more slots on the periphery thereof and co-rotatable with the shaft about its rotational axis. A gap is formed between the light source and detector and the periphery of the rotating disks passes through the respective gaps. When the slot passes through the gap, light passes therethrough and activates the detector, thereby providing an indication of the slot. This is an on/off mechanism and is not subject to variations in intensity or polarization angle.

In yet another embodiment of the present invention, the torque is displayed on a display along with the calculated horsepower and RPMs. In addition, the peak torque for a given RPM can be stored and retrieved at a later time for display.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
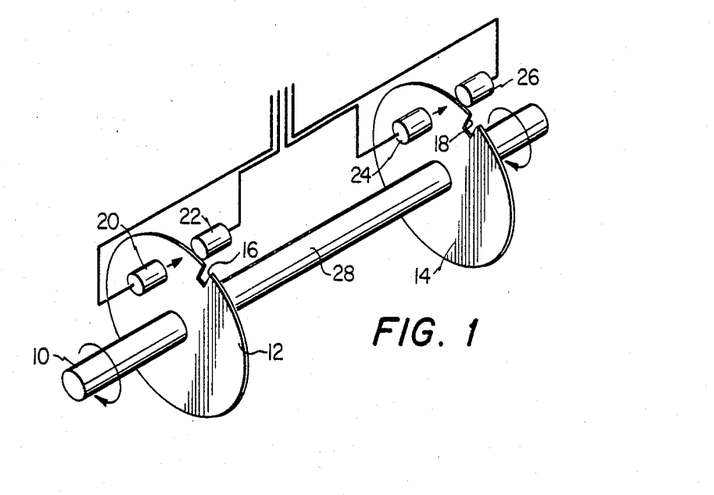
FIG. 1 illustrates a perspective view of the apparatus of the present invention.

Referring now to FIG. 1, there is illustrated a perspective view of a rotating shaft 10 utilizing the present invention to measure the torque applied thereto. A disk 12 is mounted at a first position on the shaft 10 and a disk 14 is mounted at a second position on the shaft 10. The disks 12 and 14 are displaced by a predetermined distance along the shaft 10 and are co-rotatable therewith.

The disk 12 has a slot 16 disposed on the periphery thereof and the disk 14 has a slot 18 disposed along the periphery thereof. A light source 20 is disposed on one side of the disk 12 at a right angle thereto such that the light emitted therefrom will pass through the slot 16. A detector 22 is disposed on the other side of the disk 12 at right angles thereto. The detector 22 is positioned such that light emitted by the light source 20 impinges thereon when the slot 16 passes thereby. The light source 20 and the detector 22 are stationary with respect to the rotating shaft 10.

A light source 24 is disposed proximate the disk 14 about the periphery thereof such that light emitted therefrom passes through the slot 18 when the slot rotates past the light source 24. A detector 26 is disposed on the opposite side of the disk 14 from the light source 24 such that light passing through the slot 18 impinges upon the detector 26. The light source 24 and the detector 26 are stationary with respect to the rotating shaft 10, as described above with reference to the light source 20 and the detector 22.

As described above, the slotted disks 12 and 14 are displaced a predetermined distance apart with a portion of the rotating shaft 10 disposed therebetween. Hereinafter, this portion of shaft between the disks 12 and 14 will be referred to as the "shaft portion 28". During rotation of the shaft portion 28 under a "No Load" condition, the angular relationship of the disk 12 with respect to the disk 14 remains constant. However, if the shaft 10 is torqued, a corresponding torsional movement or twist in the shaft portion 28 will result. This twist of the shaft portion 28 results in a relative angular deviation between the disks 12 and 14. The amount of this twist is a function of the torque and the properties of the shaft portion 28.

To measure the amount of angular deviation between the two disks 12 and 14, the output of the detectors 22 and 26 are monitored to determine the angular position at which the respective slots 16 and 18 pass by the detectors 22 and 26. By determining the point in time at which the light from the light source 20 impinges upon the detector 22, an indication can be obtained of the relative position of the slot 16 with respect to the rotation of the shaft about its longitudinal axis. In a similar manner, measurement of the output of the detector 26 also provides the relative position of the slot 18 with respect to the rotation of the shaft 10. By comparing the outputs of the detectors 22 and 26 with respect to time, a relative angular position of the slots 16 and 18 can be obtained. In this manner, an angular deviation due to twist on the shaft portion 28 can be determined with a high degree of precision.

Figure 2:
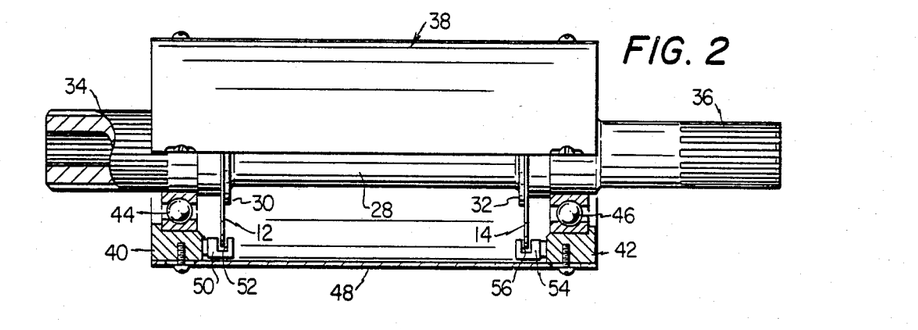
FIG. 2 illustrates a cross sectional view of the apparatus of the present invention with the cowling in place.

Referring now to FIG. 2, there is illustrated a cross sectional diagram of the apparatus of FIG. 1 wherein like numerals refer to like parts in the various figures. The shaft portion 28 has an integral collar 30 disposed at one end thereof for mounting of the disk 12 thereto and an integral collar 32 disposed at the other end thereof for mounting of the disk 14 thereon. The shaft portion 28 has a spline 34 disposed at one end thereof and a spline 36 disposed at the other end thereof to accept standard drive shaft coupling devices which allow the dynamometers of the present invention to replace a portion of the drive shaft between the engine and its load.

A stationary housing 38 is disposed about the shaft portion 28. The stationary housing 38 consists of an annular support member 40 disposed about one end of the shaft portion 28 and an annular support member 42 disposed about the other end of the shaft portion 28. The annular support member 40 is coupled to the shaft portion 28 through a bearing and race assembly 44 and the annular member 42 is coupled to the other end of the shaft portion 28 by a bearing and race assembly 46. A cylindrical cowling 38 is disposed about the annular members 40 and 42 to provide a total enclosure about the shaft portion 28 to protect against the environment. The bearing and race assemblies 44 and 46 permit the shaft portion 28 to rotate independent of the stationary housing 38. The stationary housing 38 is attached to the vehicle to prevent movement thereof.

The light source 20 and the detector 22 are integral parts of a slot detector assembly 50 which is mounted to the annular member 40 and has a groove 52 formed therein for disposal about the periphery of the disk 12. The light source 24 and detector 26 are integral parts of a slot detector assembly 54 that is mounted to the annular member 42 and has a groove 56 formed therein for disposal about the periphery of the disk 14. The slot detector assemblies 50 and 54 have the respective light source mounted on one side of the respective grooves 52 and 56 and the detector mounted on the other sides of the grooves. When the slots 16 and 18 in the respective disks 12 and 14 pass through the respective grooves in the detector assemblies, corresponding outputs are obtained from the slot detector assemblies 50 and 54.

Figure 3:
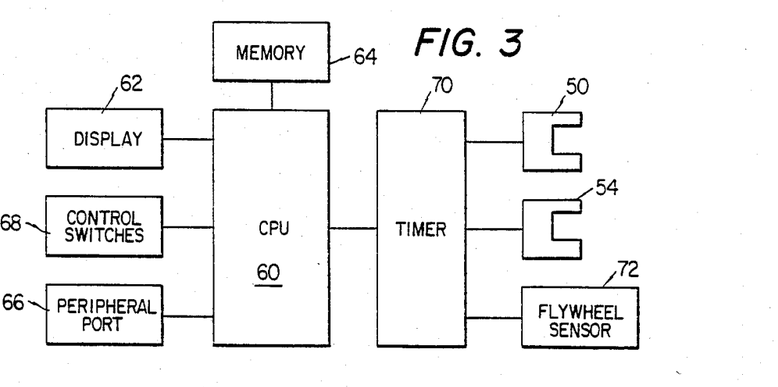
FIG. 3 illustrates a block diagram of the central processing unit.

Referring now to FIG. 3, there is illustrated a schematic block diagram of a central control system for determining the relative angular displacement between the slots 16 and 18 on the disks 12 and 14, respectively. The system includes a central processing unit (CPU) 60 that performs all of the calculations and, in general, controls the operation of the dynamometer. The central processing unit 60 is interfaced with a display 62 for displaying calculated torque, horsepower and shaft RPM. A memory 64 is provided for storage of program instructions for the CPU 60. The memory 64 can be either a volatile memory, a non-volatile memory or a combination of both. A peripheral port 66 is provided to allow access to the CPU 60 from peripheral devices for operations such as calibration, programming, etc. Control switches 68 are also provided for allowing external manipulation of parameters stored in the memory 64 such that the calculations performed by the CPU 60 can be modified. These parameters and the operations thereof will be described hereinbelow.

A timer 70 is interfaced between the slot detector assemblies 50 and 54 and the CPU 60. The timer 70 receives the outputs from the slot detectors 50 and 54 and measures the time between slot detection for each of the assemblies 50 and 54. This is a two state measurement for each of the slot detector assemblies 50 and 54; that is, an ON state and an OFF state. A flywheel sensor 72 is also provided and interfaces with the timer 70. The flywheel sensor 72 is disposed proximate the teeth on the flywheel of an engine to sense the movement of the teeth. The timer 70 times the distance between flywheel teeth receiving and this information is passed on to the CPU 60 for processing thereof. The CPU 60 can be any type of microprocessor based computer such as that utilizing a Z8671 microprocessor manufactured by Zilog. In addition, a microboard computer such as that manufactured by RCA, model number CDP185601 can be utilized which provides all of the microprocessor functions with the addition of onboard clocks, memory and memory slots. In addition, a microprocessor can be utilized that has the timer formed integral therewith such that all timing functions can be software based and the requirement for the timer 70 can be alleviated.

Figure 4A:
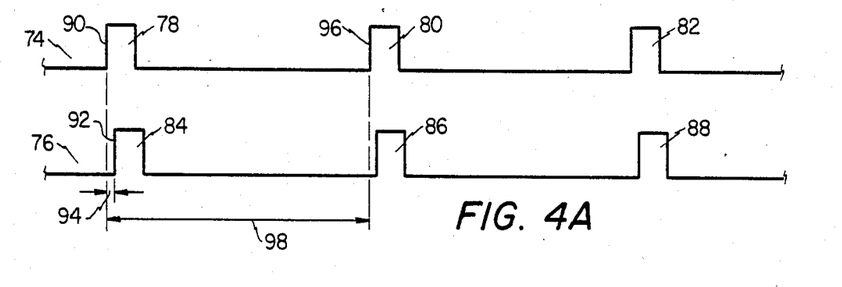
FIGS. 4a and 4b illustrate timing diagrams for the output pulses from the optical sensors.
Figure 4B:
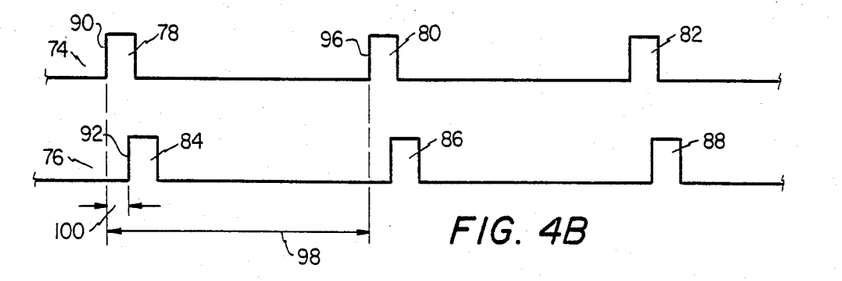

Referring now to FIGS. 4a and 4b, which illustrate timing diagrams for the output of the slot detector assemblies 50 and 54, the description of the system will be described in more detail. With particular reference to FIG. 4a, there is illustrated a waveform 74 and a waveform 76. The waveform 74 corresponds with the output of the sensor assembly 50 and is comprised of a series of pulses, each pulse representing one rotation of the disk 12 and a corresponding pass of the slot 12 throught the groove 52. As the slot 16 and the disk 12 passes through the groove 52 the output of the slot detector assembly 50 goes from a logic low state to a logic high state. Once the slot 12 has passed through the groove 52, the output of the slot detector assembly 50 returns to a logic low state. This is repeated for each revolution of the disk 12. In a like manner, the slot 18 on the disk 14 passing through the groove 56 on the slot detector assembly 54 produces a series of pulses going from a logic low to a logic high state, as illustrated in the waveform 76. Since there are only two logic states to distinguish between in processing the data, such factors as amplitude variations, variations in light intensity and noise do not effect the processing of the data. It is only necessary to distinguish between a logic high state and a logic low state.

With reference to the waveform 74 in FIG. 4a, there is illustrated three pulses 78, 80 and 82. The wave form 76 also has illustrated three pulses 84, 86 and 88. When the slot 16 and the disk 12 rotate into the groove 52 on the sensor assembly 50, the pulse 78 is generated with a leading edge 90 defining the transition from the logic low to the logic high state. By sensing this leading edge 90, a time reference can be established. With reference to waveform 76, the next occurring pulse is the pulse 84 which has a leading edge 92. This leading edge 92 produces a second time reference. By measuring the amount of time elapsed between the occurrence of the leading edge 90 and the occurrence of the leading edge 92, a time difference 94 can be established and this compared with the RPM information of the shaft, as will be described hereinbelow, to provide additional information on the slots 16 and 18.

To obtain information regarding the time for the shaft to go through a revolution, the time lapse between the leading edge 90 and a leading edge 96 of the pulse 80 on the waveform 74 is measured. This is indicated by a time difference 98. Therefore, for each occurring leading edge of the pulses and the waveform 74, a time difference can be measured which can be directly translated into revolutions per unit time.

In order to determine the angular deviation between the two slots, it is then only necessary to divide the time difference 94 by the time difference 98, which is the time required for 360° of travel, and multiply the result by 360°. This will result in the number of degrees of offset between the slots 16 and 18 on the disks 12 and 14, respectively.

In initially lining up the two slots 16 and 18 along the rotational axis of the shaft 10, it is not necessary that both slots are exactly lined up, that is, a zero angular deviation exists. It is only necessary to determine the difference between a "no load" condition to a loaded condition to determine the angle of twist. For example, if the slots 16 and 18 are offset by 15° initially with "no load" on the shaft, the time difference 94 will have a predetermined value for a given rotational speed of the shaft portion 28. For this example, the time difference 94 represents the initial time difference under a "no load" condition. Referring now to FIG. 4b, there is illustrated the waveforms of FIG. 4b, with the leading edges 90 and 92 of the pulses 78 and 84, respectively, separated by a time difference 100. The time difference 100 is greater than the time difference 94 and is representative of an angular deviation due to torsion on the shaft portion 28. The shaft revolution rate is the same, and therefore, the distance between successive pulses 78 and 80 is the same. The angular deviation for the "no load" condition is determined prior to applying torque to the shaft 10 and this value is stored. Thereafter, each time the angular deviation is measured, this angular deviation is adjusted by the initial offset that is stored. In this manner, initial fabrication errors can be tolerated in the offset of the slots 16 and 18 without the requirement for expensive and time consuming alignment procedures.

Although the present embodiment requires that the leading edge 90 occur before the leading edge 92 or simultaneously therewith, it should be understood that it is merely the time difference between the two leading edges under a "no load" condition and a loaded condition that must be measured to determine the angular deviation. For example, if the direction of rotation were reversed, the leading edge 92 may occur prior to the leading edge 90. In this situation, applied torque would result in the time difference between the leading edges 90 and 92 in the above example decreasing rather than increasing. However, it is only necessary then to determine the actual measured angular deviation and then compare it with the stored deviation to calculate the actual angular deviation between the slots 16 and 18.

The resolution of the dynamometer can be increased by increasing the number of slots on the periphery of the disks 12 and 14. The only limiting factor is the total angle of twist that would be incurred under maximum torsional stress. For example, if the shaft portion 28 only incurred a maximum twist of 85°, then it would be possible to utilize four slots on the periphery of each of the disks 12 and 14. In this manner, some of the successive pulses from the sensor assemblies 50 or 52 will overlap.

Once the angular deviation is determined, the torque can then be calculated. In order to calculate the torque, the properties of the shaft portion 28 must be known. The shaft portion 28 is fabricated from a homogeneous, isotropic material which will not be subjected to forces exceeding the proportional shear limits or bending moments that the shaft will be subjected to. The shaft portion 28 must also consistently twist under torsional stresses and return to the original form when the stresses are released. This torsional deformation is described by the formula:

$$\phi = \frac{TL}{JG}$$

where:
T is the torsional stress (torque applied),
L is the length of the shaft through which the measurement is made, J is the polar moment of inertia (a constant for a given shaft configuration), G is the torsional modulus (a constant for a given homogeneous material), and $\phi$ is the total angle of twist.

Once the twist of the shaft portion 28 is determined, the only unknown parameter in the above equation is torque, which can then be calculated. This information is stored in conjunction with the RPMs of the shaft 10 in the memory 64 which is, in the preferred embodiment, a Random Access Memory (RAM). Simultaneous with storing the data, the data is also displayed on the display 62. When the next twist measurement is made and the torque calculated it is compared with the previously stored data and the larger value of torque stored in place thereof. In this manner, the peak torque can be stored in conjunction with the RPM at which this peak torque occurred. At a later time, the operator of the vehicle can retrieve the peak torque to determine the performance of his vehicle. In addition to RPMs of the shaft 10, the flywheel sensor 72 can also be measured to provide information as to engine RPMs.

Although not shown, a recorder can be connected to the CPU 60 through the peripheral port 66 for maintaining a torque versus time curve for the vehicle performance as a function of the shaft RPMs. This data can be recorded on such things as a magnetic disk or a chart recorder. In this manner, a vehicle operator can have a permanent record of the vehicles performance for later reference.

Figure 5:
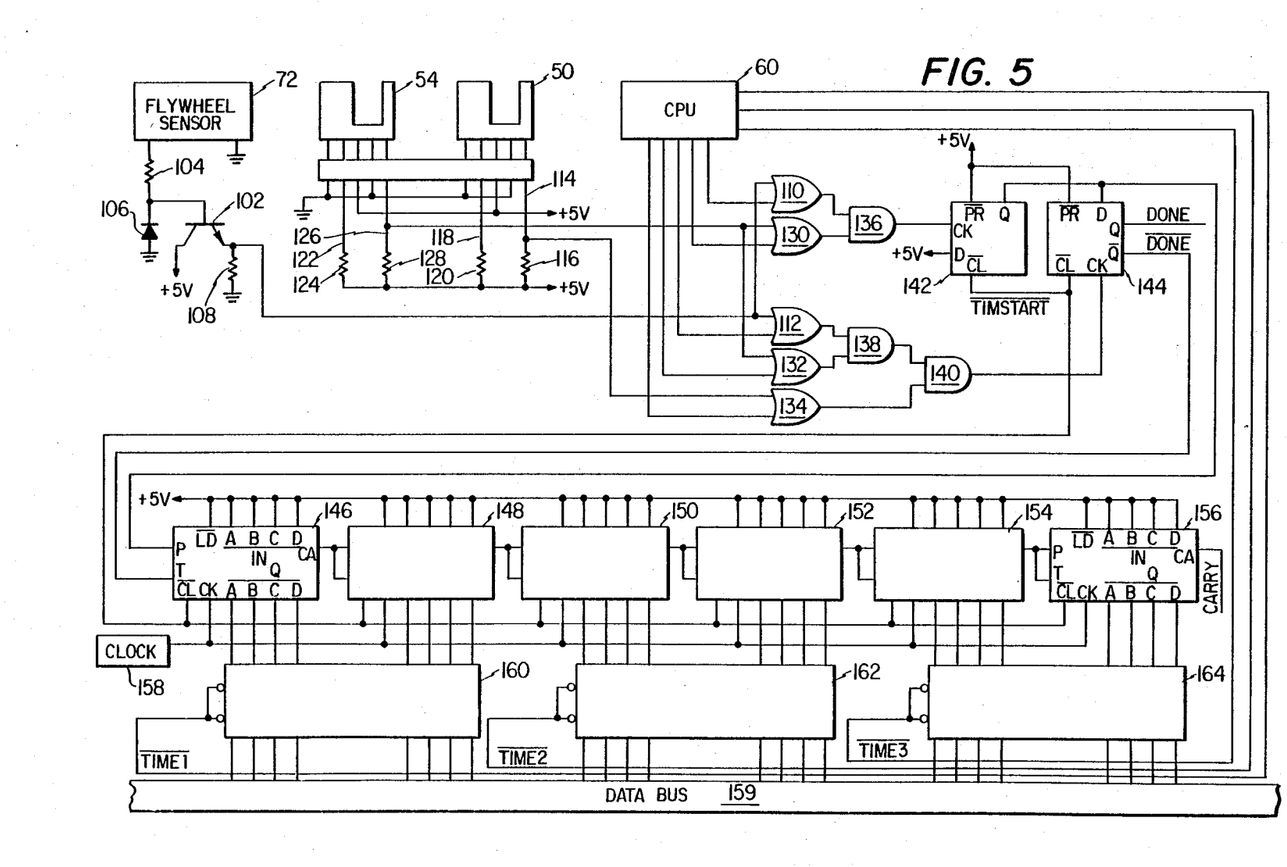
FIG. 5 illustrates a schematic diagram of the timing circuit.

Referring now to FIG. 5, there is illustrated a schematic diagram of the timer 70 of FIG. 3. The flywheel sensor 72 has the output thereof input to the base of a NPN transistor 102 through a series resistor 104. A diode 106 has the cathode thereof connected to the base of the transistor 102 and the anode thereof connected to the ground. The diode 106 rectifies the sinusoidal signal output by the flywheel sensor 72. The collector of the transistor 102 is connected to a positive voltage supply and the emitter thereof is connected to ground through a series resistor 108. The emitter of the transistor 102 is also connected to one input of an OR gate 110 and one input of an OR gate 112. The output of the transistor 102 is the detected flywheel sensor signal FLY which is essentially a series of pulses. The flywheel sensor 72 is a Hall effect device of the Type G manufactured by Wabash.

The slot detector assembly 50 is an optoelectronic sensor of the type OS591S manufactured by HEI which consists of an LED source, a sensor and an amplifier. The output of the amplifier and the sensor is TTL open collector. Each of the sensor assemblies 50 and 54 have four inputs thereto. Two of these inputs are connected to ground and the other two inputs provide DC bias for the LED source and the sensor. The sensor assembly 50 has an input 114 which is connected to a positive supply voltage through a resistor 116 and an input 118 which is connected to the positive voltage supply through a resistor 120. The signal output from the input line 114 is the output of the sensor and is labeled OPTO1. The sensor 54 has a light source input 122 therefor connected to the positive voltage supply through a resistor 124 and a sensor input 126 connected to the positive voltage supply through a resistor 128. The sensor input 126 is labeled OPTO2.

The OPTO1 signal is input to one input of an OR gate 130 and one input of an OR gate 132. The OPTO2 signal is input to one input of an OR gate 134. The output of the OR gate 110 and the output of the OR gate 130 are input to the two inputs of an AND gate 136. The outputs of the OR gates 112 and 132 are input to the two inputs of an AND gate 138. The output of the AND gate 138 and the output of the OR gate 134 are input to an AND gate 140. The output of the AND gate 136 is input to the clock input of a D-type flip flop 142. The output of the AND gate 140 is input to the clock input of a D-type flip flop 144. The Q output of the flip flop 142 is input to the data input of the flip flop 144 and the preset inputs of both the flip flops 142 and 144 are connected to a positive voltage supply. The clear inputs of the flip flops 142 and 144 are connected to a $\overline{\text{TIM START}}$ signal which is a signal that indicates when timing is to be initiated. The data of the flip flop 142 is connected to the positive voltage supply.

The remaining inputs of the OR gates 110, 112, 130, 132 and 134 are connected to the CPU 60 to supply control signals therefor. With the control signals output by the CPU 60, any one of the OR gates attached thereto can be activated. In this manner, a number of options, as will be described hereinbelow, can be selected through software programs stored in the memory 64.

The data output of the flip flop 144 is connected to the Enable P input of a 4-bit synchronous counter 146. The inverted Q output of the flip flop 144 is connected to the Enable T input of the counter 146. The inverted Q output of the flip flop 144 is labeled $\overline{\text{DONE}}$ and the Q output of the flip flop 142 is labeled START. The counter 146 is sequentially connected to five similar 4-bit synchronous counters 148, 150, 152, 154 and 156. To make this connection, the preceding one of the counters 146–154 have the Carry Out outputs thereof connected to the Enable T and Enable P inputs of the following counter. In this configuration, a 24-bit counter is realised. All of the counters 146–156 have the clear inputs thereof connected to the $\overline{\text{TIMSTART}}$ signal and the clock inputs thereof connected to an external clock 158. The clock 158, although shown separate, is, in the preferred embodiment, the system clock. However, it can be an external clock that is synchronized with the internal clock. All the A, B, C, and D inputs and the Load inputs are connected to the positive voltage supplies.

The counters 146–156 are of the type SN74LS161 manufactured by Texas Instruments Incorporated. Each of the 4-bit outputs from the counters 146 and 156 can be input to the CPU 60, provided that the CPU 60 can accommodate a 24-bit input. However, the preferred embodiment only samples 8-bits at any one time depending upon the clock signal. To facilitate sampling 8-bits, the 4-bits output from the counter 146 and the 4-bits output from the counter 148 are input to a three-state driver 160, the outputs of which are connected to a data bus 159. The 4 output bits from each of the counters 150 and 152 are input to a three-state driver 162, the output of which is connected to the data bus 159. The 4-bit outputs from the counters 154 and 156 are input to a three-state driver 164, the outputs of which are connected to the data bus 159. Each of the drivers 160–164 has a separate Enable input which is connected to the output of the CPU 60 to determine which of the 8-bit segments are to be sampled. In this manner, it is not necessary to have the capacity to sample a 24-bit word while retaining timing resolution of a 24-bit word. In addition, differing clock times can be utilized which will result in a larger number of clock cycles counted for a given duration of elapsed time between the two pulses, as described above. For example, if a clock frequency from the clock 158 were utilized that would result in the Carry Out from the counter 158 activating the counter 152, it would only be necessary to activate at a minimum the buffers 160 and 162 since the counters 154 and 156 have not been activated. If the resolution is not required, the 8-bits input to the driver 160 from the counters 146 and 148 may not be necessary. Therefore, an 8-bit counter should be sufficient with the counters 146 and 148 serving as a divider.

In operation, the CPU outputs a signal to the inputs of the OR gates 110 and 130 to determine which of the OR gates is to be activated. If the flywheel sensor is to have the time duration between pulses input therefrom the input to the OR gate 110 is held at a logic low state and the input to the OR gate 130 is held at logic high state. However, if torque is to be measured, the input to the OR gate from the CPU 60 is held at a logic high state and the input to the OR gate 130 from the CPU 160 is held at a logic low state. A logic low state on one input of the OR gates 110 or 130 allows the remaining input to control the logic state on the output thereof. Therefore, the output of the AND gate 136 reflects the logic state on the remaining input of the selected one of the OR gates 110 or 130. The OR gates 110 and 130 and the AND gates 136, in addition to the flip flop 142, constitute the starting circuitry for the timer circuit 70. When a positive transition is input to the clock input of the flip flop 142, the data, which is held at a logic high state, is clocked through to the Q output thereof. This line is labeled START.

The remaining three OR gates 112, 132 and 134, also have the ability to select the pulse which stops the timer. This pulse is the output from the flywheel sensor circuitry FLY or the OPTO2 signal. Therefore, the inputs to the OR gates 112 and 134 from the CPU 60 are selected with the logic low state determining which of the OR gates is allowed to control the stop signal. The OR gate 132 has the OPTO1 signal input thereto with the other input thereof connected to the CPU 60. The OR gates 112 and 132 and the AND gate 138 determine whether the flywheel sensor or the OPTO1 signal controls one input of the AND gate 140. Therefore, the CPU 60 can select the output of the flywheel sensor circuitry or the outputs from either of the slot detector assemblies 50 and 54 to stop the timer. The output of the AND gate 140 clocks the data on the input of flip flop 144 to the outputs thereof. If the leading edge of the OPTO1 signal has occurred, this data is a logic high and the counter begins counting at that point. When this data is clocked through the flip flop 144, the $\overline{DONE}$ signal changes logic state and the Enable T input of the counter 146 changes state, thereby inhibiting further counting of counters 146–156. Depending upon which of the OR gates 112, 132 or 134 controls the output of the AND gate 140, the timer will stop on the leading edge of the pulse output by the flywheel sensor, the slot detector assembly 50 or the slot detector assembly 54.

Once the time duration has been measured, the CPU stores this value and calculates the desired parameter. For example, if the RPMs of the flywheel is to be determined, the OR gates 110 and 112 are allowed to control the operation of the AND gates 136 and 140, respectively. Therefore, the time duration between leading edges of two successive pulses will be measured. This time duration is then input to an algorithm which takes into account the number of teeth on the flywheel, which, when multiplied by this number, would equal the time for one revolution. However, when torque is to be measured, it is necessary to determine the time for one revolution of the shaft portion 28 and then determine the time difference between the pulses output by the slot detector assembly 50 and the pulses output by the slot detector assembly 54. To determine the time for one revolution, the OR gates 130 and 132 are allowed to control the outputs of the AND gates 136 and 140, respectively. After this time duration has been measured, the OR gates 130 and 134 are activated to control the outputs of the AND gates 136 and 140 respectively. The time difference between the pulses output by the sensors 50 and 54 is then divided by the time difference for one revolution between two successive pulses from the sensor 50. This number is then multiplied by 360 to determine the number of degrees that the time difference between the pulses output by the two sensor assemblies 50 and 54 equals. If a calibration factor must be subtracted due to misalignment of the two disks 12 and 14, this can be accomplished with retrieval of a prestored calibration factor. The torque can then be calculated, as described above.

After the torque and the RPMs of the shaft 10 have been calculated, a number of other parameters can be easily calculated therefrom. For example, shaft horsepower can be calculated by multiplying the torque times the shaft RPMs and dividing this by a factor of 5,252. In addition, miles per hour can be calculated by multiplying the shaft RPMs by a constant which takes into account the differential gear ratios between the shaft and the driven wheels. All of these parameters can be stored in the memory for later retrieval and display or can be instantaneously displayed on the display 62.

Figures 6, 7:
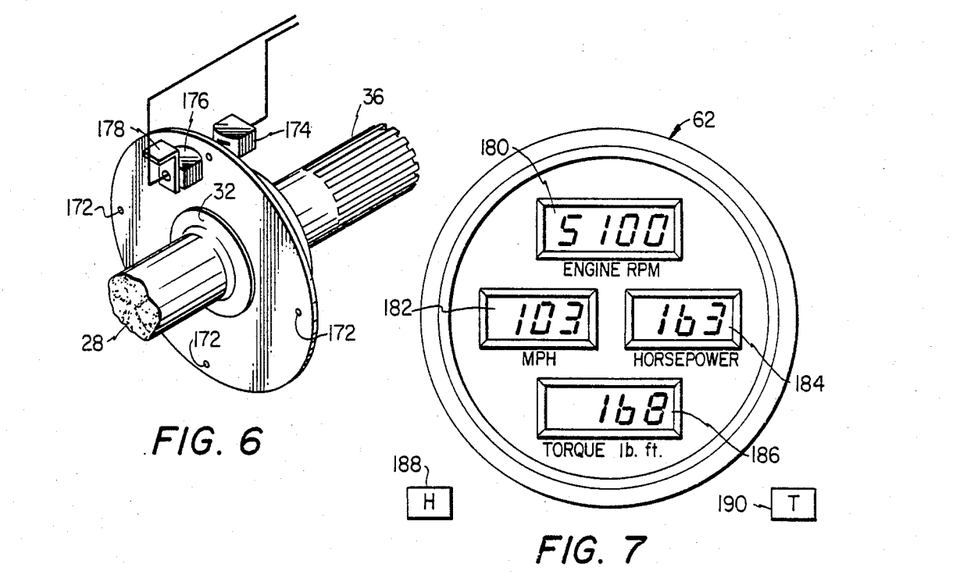
FIG. 6 illustrates an alternate embodiment of the present invention using magnetic sensors.
FIG. 7 illustrates a display for displaying torque horsepower and RPM's.

Referring now to FIG. 6, there is illustrated a perspective view of an alternate embodiment of the present invention. For simplicity purposes, only one sensor in the alternate embodiment is illustrated. However, it should be understood that two sensors are utilized, each sensor resulting in a two state output signal that can be input to the circuitry of FIG. 5. Like numerals refer to like parts in the various figures. A non-magnetic disk 170 is disposed onto the collar 32 on the shaft portion 28. A similar disk is disposed on the collar 30 on the other end of the shaft portion 28. The disk 170 can be fabricated from any non-magnetic material that will withstand the rotational inertia that is incurred in operating the present apparatus. A piece of iron wire 172 is disposed in the periphery of the disk 170 for rotation therewith. A magnetic recording head 174 and a magnetic reading head 176 are mounted on either side of the periphery of the disk 170 and perpendicular thereto with a gap formed therebetween. They are mounted in such a manner that the periphery of the disk 170 and the iron wire 172 pass through the gap. The non-magnetic material of the disk 170 blocks transmission of a signal from the reading head 176 to the recording head 174. However, when the iron wire 172 passes between the heads 174 and 176, a signal will pass therebetween. An identical recording and reading head are disposed on the opposite end of the housing 38 to operate in a similar manner to that described above. In order to obtain more resolution, it is possible to dispose the iron wire 172 at four or more locations around the periphery of the disk 170 spaced 90° apart. In this manner, the number of pulses received per revolution will be increased. The magnetic heads 174 and 176 in conjunction with the disk 170 and the wire 172 operate similar to the sensor assemblies 50 and 54 and the slotted disks 12 and 14.

In addition to optoelectronic sensors and magnetic sensors, other types of mechanisms can be utilized for the contactless sensors. For example, capacitive plates or hall effect devices can be utilized. It is only necessary that they generate a two state output.

Referring now to FIG. 7, there is illustrated a frontal view of the display 62. The display 62 has four digital displays thereon. A digital display 180 displays the engine RPM, a digital display 182 displays the speed of the vehicle in miles per hour, a digital display 184 displays the horsepower and a digital display 186 displays the torque in pounds-foot. A push button 188 is provided on the front panel adjacent the display 62 and is marked with an "H". A push button switch 190 is provided on the front panel adjacent the display 62 and is marked with a "T". The display 62 allows for display of all pertinent data calculated and stored by the CPU 60.

There are three levels of operation of the present display 62 under control of the CPU and the push button switches 188 and 190. In the first mode, current data regarding the engine RPM, vehicle speed, horsepower and torque is displayed. Since the CPU 60 operates at a much faster rate than the human eye, the display 62 is updated at periodic intervals. In this manner, the operator is not distracted by instantaneous changes of the parameters over very short intervals of time. The updating of this display will be described hereinbelow.

In the second mode of operation, the operator can retrieve from memory the peak torque for a given set of operating conditions. This peak torque is stored in a predetermined address in memory along with information regarding vehicle speed and engine RPM. By pressing the push button 190, the display 184 for displaying horsepower outputs a string of zeros and the peak torque that was stored is displayed onto the display 186 along with the associated vehicle speed and the engine RPM at that speed. In this manner, an operator can determine at which point on the operating curve of the vehicle and its engine the peak torque occurred.

In the third mode of operation, peak horsepower can be retrieved from memory. By pressing the push button 188, peak horsepower is retrieved from a predetermined address location in the memory and displayed on the display 184. The torque display 186 outputs a string of zeros and the engine RPM and vehicle speed displays 180 and 182, respectively, output the associated parameters for the peak horsepower. This allows the operator to determine at which point on the operating curve of the vehicle and its engine the peak horsepower was obtained.

Figure 8:
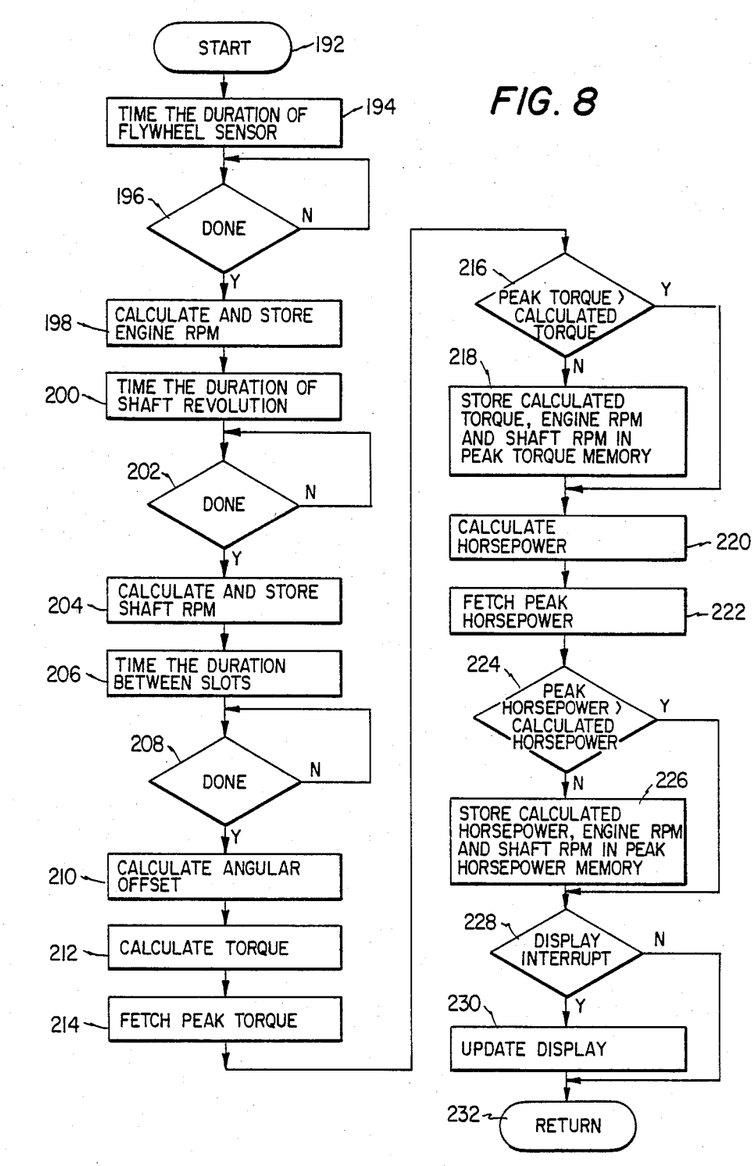
FIG. 8 illustrates a flow chart for the operation of the system.

Referring now to FIG. 8, there is illustrated a flow chart depicting the operation of the system in accordance with the present invention. The flow chart is initiated at a start block 192 and then flows to a function block 194 to time the duration of the flywheel sensor. As described above, this timing involves measuring the time duration between successive teeth on the flywheel. The flow chart then proceeds to a decision block 196 to determine whether the $\overline{\text{DONE}}$ signal has been generated, at which time it proceeds along the "Y" path thereof to a function block 198 to calculate and store engine RPM. As described above, the $\overline{\text{DONE}}$ signal is indictive of completion of the timing operations of the timer 70. The program flows back to the input of the decision block 196 along the "N" path thereof until the DONE signal is generated, at which time it proceeds along the "Y" path thereof to a function block 198 to calculate and store engine RPM. As described above, this entails multiplying the time duration by a constant to determine the time for one complete revolution.

After calculating the engine RPM, the program flows to a function block 200 to time the duration of a given shaft revolution. As described above, this is the mode in which the OPTO1 signal both starts the timer and stops the timer. The program flows to a decision block 202 to determine whether the $\overline{\text{DONE}}$ signal has been generated. Until the $\overline{\text{DONE}}$ signal has been generated, the program returns to the input of the decision block 202 along the "N" path thereof. When the $\overline{\text{DONE}}$ signal is generated, the program flows along the "Y" path thereof to a function block 204 to calculate and store the shaft RPM. The program then flows to a function block 206 to time the duration between the occurrence of the two slots 16 and 18. As described above, the OPTO1 signal initiates the timer operation and the OPTO2 signal terminates operation of the timer. The program flows to a decision block 208 to determine whether the $\overline{\text{DONE}}$ signal has been generated. Until the $\overline{\text{DONE}}$ signal is generated, the program flows back to the input of the decision block 208 along the "N" path thereof, at which time, the progrom flows along a "Y" path to a decision block 210 to calculate the angular offset between the two disks 12 and 16. The program then flows to a function block 212 to calculate the torque in accordance with above described equation.

After calculating engine RPM, shaft RPM and torque, the program flows to a function block 214 to fetch the peak torque that is stored in a predetermined memory location. The program then flows to a decision block 216 to determine whether the stored peak torque is greater than the calculated torque. If the calculated torque is greater, the program flows along the "N" path to a function block 218. The function block 218 indicates the step whereby the present value for the calculated torque, engine RPM and shaft RPM are stored in the predetermined memory location for peak torque in place of the presently stored peak torque; that is, the peak torque is updated. If the calculated torque is less than the prestored peak torque value, the program flows along the "Y" path from the decision block 216 to the output of the function block 218, both of which flow to a function block 220.

The function block 220 indicates a step whereby horsepower is calculated by multiplying the torque by the shaft RPM and dividing it by a constant. The program then flows to a function block 222 wherein a prestored peak horsepower is fetched from a predetermined memory location and then the program flows to a decision block 224. The decision block 224 compares te prestored peak horsepower with the calculated horsepower. If the calculated horsepower is greater than the prestored peak horsepower, the program flows along the "N" path thereof to a function block 226. The function block 226 indicates a step whereby the prestored peak horsepower is updated with the present value for the calculated horsepower, engine RPM and shaft RPM. If the present value for the calculated horsepower is less than the prestored peak horsepower, the program flows along the "Y" path from the decision block 224 to the output of the function block 226, both of which are input to a decision block 228.

The decision block 228 determines whether the display interrupt is present. As described above, the display is only updated at certain times. This can be accomplished by using a software timer or by using an external timer of some form. For example, it may be necessary to only update the display once every second or even delay updates a longer length of time. If the display interrupt is present, the program flows along the "Y" path from the decision block 228 to the function block 230 to update the display. The program then flows to a return block 232 to return to the start block 192 and obtain a new set of parameters. If the display interrupt is not present, the program flows from the decision block 228 along the "N" path thereof to the input of the return block 232. The only data that is retained during one pass of the program from the start block 192 to the return block 232 is the peak torque, peak horsepower and the associated parameters therefor. In addition, if the display interrupt is present, the present value for all of the parameters are stored in a display buffer and output to the display. When the program returns to the start block 192, all of the present calculated values are remeasured and recalculated.

In order to measure the torque, horsepower, speed of the vehicles and engine RPM, it is necessary for the drive shaft to rotate approximately three revolutions. However, a dedicated timer could be utilized for timing the rotational speed of the shaft, the angular offset of the two disks and the RPM of the flywheel.

In summary, there has been provided a dynamometer that measures the torque on a shaft under dynamic operating conditions. The dynamometer utilizes two rotating disks disposed a predetermined distance apart on a drive shaft. Each of the disks has a slot in the end thereof for passing between separate light sources and sensors. When the slot on each of the disks passes between the respective sensors a separate signal is generated. Each of the signals has two states without the requirement to determine other parameters of the signal. By timing the duration between the two signals, angular deviations can be determined. From these angular deviations, actual torque on that portion of the shaft between the disk can be calculated.

Although the preferred embodiment has been described in detail, it should be understood that various changes, substitutions and alterations can be made therein without departing from the spirit and scope of the invention as defined by the appended claims.

What is claimed is:

1. An apparatus for measuring torque on a rotating shaft, comprising:
 a first sensor mounted proximate the shaft and having first and second states;
 a first circular disk mounted on the shaft for rotation therewith, said disk having a first discrete reference area on the surface thereof for momentarily changing the state of said first sensor from a first state to a second state when said reference area is aligned with said sensor;
 a second sensor mounted proximate the shaft and having first and second states;
 a second circular disk mounted on the shaft for rotation therewith and displaced a predetermined distance from said first circular disk, said second circular disk having a second discrete reference area on the surface thereof for momentarily changing the state of said second sensor from a first state to a second state when said reference area is aligned with said sensor, the position of said second reference area being independent of the position of said first reference area about the circumference of said shaft;
 means connected to said first and second sensors for comparing the states thereof to determine the relative angular position of said first and second reference areas when said first and second sensors momentarily change states, said comparing means calibrating the positional deviations of said first and second reference areas under low torque conditions such that the relative angular position is a function of torque only and not angular position under low torque conditions;
 means for calculating torque as a function of deviations in the compared relative angular positions of said first and second reference areas, said deviations in the relative angular positions being due to torque deviations of the shaft between said first and second reference areas; and
 means for determining peak torque over a given period of time, said determining means further including means for storing said peak torque.

2. The apparatus of claim 1 wherein said first and second sensors comprise optoelectric sensors, each having a light source and a light detector for detecting the output of said light source and said first and second reference areas comprise a slot formed respectively in the periphery of said first and second circular disks for passing between said light source and said light detector in each of said first and second sensors, respectively, to allow the light from said light source to impinge upon said light detector thereby indicating each revolution of the shaft proximate the respective one of said first and second reference areas.

3. The apparatus of claim 1 wherein said first and second sensors comprise magnetic sensors, each having a magnetic recording head and a magnetic reading head for detecting the output of said recording head and said first and second reference areas comprise ferromagnetic material located respectively on the surface of said first and second circular disks, said disks comprised of nonmagnetic material, such that the associated ferromagnetic material of the first and second reference areas passes between the respective ones of said magnetic reading and recording heads to provide a magnetic short circuit thereby indicating each revolution of the shaft proximate the respective one of said first and second reference areas.

4. The apparatus of claim 1 and further comprising display means for displaying calculated torque.

5. The apparatus of claim 4 and further comprising means for recalling the peak torque for display on said display means.

6. The apparatus of claim 1 wherein said comparing means comprises a timer for measuring the duration of time between the first reference area in said first disk changing the state of said first sensor and the second reference area in said second disk momentarily changing the state of the second sensor, and said calculating means comprises a central processing unit for receiving the output of said timer and measuring variances in the relative positions of the reference areas as a function of time on said first and second sensors and as a function of the revolution of the shaft such that twisting of the shaft between said first and second disks can be measured;
 said central processing unit calculating the torque from the measured twist in the shaft between said first and second disks.

7. The apparatus of claim 6 wherein said calculating means further calculates shafts revolution per unit time as a function of the elapsed time between two successive changes in the state of said first sensor by said first reference area and calculates horsepower as a function of said calculated torque and shaft revolutions per unit time.

8. The apparatus of claim 6 wherein said timer is calibrated to account for positional errors in the position of said first and second reference areas when the shaft has no torque applied thereto such that the time duration determined by said timer is zero for a no torque condition and other than zero for a torque condition.

* * * * *

UNITED STATES PATENT AND TRADEMARK OFFICE
CERTIFICATE OF CORRECTION

PATENT NO. : 4,520,681
DATED : June 4, 1985
INVENTOR(S) : Jeff D. Moore et al.

It is certified that error appears in the above-identified patent and that said Letters Patent are hereby corrected as shown below:

ABSTRACT, line 14     "is measure and the"
      should be --is measured and the--.

Col. 7, line 55     "The sensor assenbly 50"
      should be --The sensor assembly 50--.

Col. 12, line 54     "te prestored" should be
      --the prestored--.

Signed and Sealed this

Twenty-fifth Day of February 1986

[SEAL]

Attest:

DONALD J. QUIGG

Attesting Officer     Commissioner of Patents and Trademarks